United States Patent
Kuo

(10) Patent No.: US 6,954,809 B2
(45) Date of Patent: Oct. 11, 2005

(54) APPARATUS AND METHOD FOR ACCESSING COMPUTER SYSTEM RESOURCES VIA SERIAL BUS

(75) Inventor: Hung-Yu Kuo, Hsin-Tien (TW)

(73) Assignee: Via Technologies, Inc., Taipei (TW)

( * ) Notice: Subject to any disclaimer, the term of this patent is extended or adjusted under 35 U.S.C. 154(b) by 390 days.

(21) Appl. No.: 10/256,007

(22) Filed: Sep. 27, 2002

(65) Prior Publication Data

US 2004/0064613 A1 Apr. 1, 2004

(51) Int. Cl.[7] ............................................. G06F 13/00
(52) U.S. Cl. ...................... 710/107; 710/309; 710/310; 710/112; 710/29; 710/39
(58) Field of Search .................. 710/104–112, 305–317, 710/8–19, 2–4, 20–21, 29–40, 52, 62–65, 240–244; 711/202, 206

(56) References Cited

U.S. PATENT DOCUMENTS

| | | | | |
|---|---|---|---|---|
| 6,105,146 A | * | 8/2000 | Tavallaei et al. ................. | 714/2 |
| 6,170,027 B1 | * | 1/2001 | Lu et al. ......................... | 710/65 |
| 6,173,350 B1 | * | 1/2001 | Hudson et al. ............. | 710/100 |
| 6,446,153 B2 | * | 9/2002 | Cooper et al. .............. | 710/260 |
| 6,567,876 B1 | * | 5/2003 | Stufflebeam ................. | 710/303 |
| 6,718,407 B2 | * | 4/2004 | Martwick ...................... | 710/51 |
| 6,766,389 B2 | * | 7/2004 | Hayter et al. .................. | 710/62 |
| 2002/0178320 A1 | * | 11/2002 | Wu ............................. | 710/306 |
| 2004/0003161 A1 | * | 1/2004 | Lee et al. .................... | 710/305 |
| 2004/0098527 A1 | * | 5/2004 | Kwatra et al. .............. | 710/260 |

* cited by examiner

*Primary Examiner*—Paul R. Myers
*Assistant Examiner*—Raymond N Phan
(74) *Attorney, Agent, or Firm*—Rabin & Berdo, P.C.

(57) ABSTRACT

An apparatus for monitoring the state of computer system resources. According to the invention, the apparatus includes bus interface logic and a queue. The bus interface logic is used to interface with a serial bus and parse a bitstream through the serial bus into a command and an address. Also, the apparatus includes bridge logic, an arbitrator and a decoder. The decoder is used to decode the command. If the command represents a predetermined request for access to a resource bus, the decoder passes the predetermined request associated with the address to the queue. Whenever the predetermined request occurs, the arbitrator grants the resource bus to the predetermined request and allows the queue to output the predetermined request as well as the associated address. The bridge logic is provided to transfer data to and from computer system resources according to the predetermined request and the address.

4 Claims, 4 Drawing Sheets

200

APPARATUS AND METHOD FOR ACCESSING COMPUTER SYSTEM RESOURCES VIA SERIAL BUS

BACKGROUND OF THE INVENTION

1. Field of the Invention

The invention relates to computer systems. More particularly, the invention relates to an apparatus with typical System Management Bus (SMbus) interface for monitoring computer system resources.

2. Description of the Related Art

The System Management Bus (SMbus) is a simple bi-directional two-wire interface based on the principles of operation of $I^2C$ which is an acronym for Inter Integrated Circuit bus for efficient inter-IC control. The original purpose of the SMBus was to define the communication link between an intelligent battery, a charger for the battery and a microcontroller that communicates with the rest of the system. However, SMBus can also be used to connect a wide variety of devices including power-related devices, system sensors, inventory EEPROMs communications devices and more. There is a multitude of SMBus compatible devices commonly available and a SMBus host controller is incorporated into the majority of motherboard core logic chipsets today.

The SMBus interface provides the desired attributes and functionality, and it is a low-power, low signal-count interface that is well suited for the type of low bandwidth functions targeted. As such, the use of the SMBus allows system designers and manufactures to maximize hardware efficiency and circuit simplicity. Although SMBus compatible devices offer a lot of features and benefits, they cannot access computer system resources such as CPU, system memory, peripheral controllers and various buses. In other words, conventional SMBus compatible devices are not able to act as a master initiating a transaction to access the computer system resources. The primary barrier to this condition is the lack of a suitable mechanism that allows a SMBus device to become the master. It is unfortunate that a SMBus compatible device is not capable of performing a data transfer directly with the computer system resources.

In view of the above, there is a need for a mechanism that overcomes the prior art barrier.

SUMMARY OF THE INVENTION

It is an object of the present invention to provide an apparatus with SMbus serial interface for monitoring computer system resources, able to act as a master initiating a transaction to access the computer system resources.

It is another object of the present invention to provide a method for a two-wire serial bus to read/write data from/to the computer system resources.

The present invention is generally directed to an apparatus for monitoring computer system resources. According to one aspect of the invention, the inventive apparatus includes a queue, bus interface logic, bridge logic, a decoder and an arbitrator. The bus interface logic is used to interface with a two-wire serial bus and parse a bitstream through the two-wire serial bus into a command and an address. Preferably, the two-wire serial bus is compliant with the System Management Bus (SMBus) specification. The decoder receives the command from the bus interface logic and decodes it. If the command represents a predetermined request for access to a resource bus where computer system resources reside, the decoder further passes the predetermined request associated with the address to the queue. Whenever the predetermined request occurs, the arbitrator grants the resource bus to the predetermined request and allows the queue to output the predetermined request associated with the address. The bridge logic is provided to interface with the resource bus. It can transfer data to and from the computer system resources according to the predetermined request and the address.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

Figure 1:
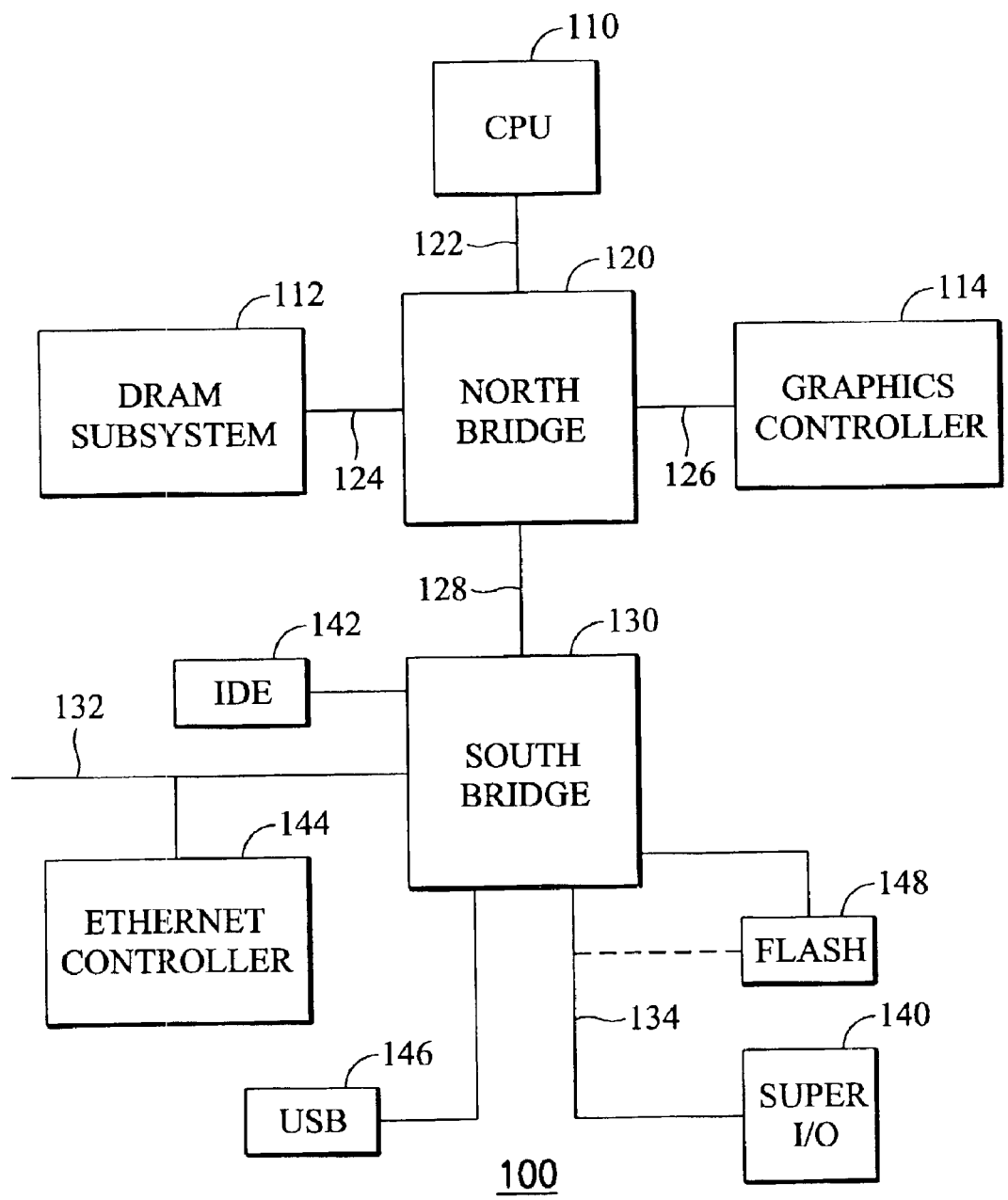
FIG. 1 is a block diagram illustrating an exemplary computer system useful in understanding the invention.

As illustrated in FIG. 1, exemplary computer system 100 is shown including a system chip and a datapath chip commonly referred to as the North Bridge 120 and the South Bridge 130, respectively. The term "Bridge" comes from a reference to a device that connects multiple buses together. The North Bridge 120 acts as the connection point for a CPU 110, a DRAM subsystem 112, a graphics controller 114 and the South Bridge 130. It connects a front side bus (FSB) or CPU bus 122 to a DRAM bus 124, an AGP graphics bus 126, and a dedicated interconnection 128 for the South Bridge 130. The South Bridge 130, in its simplest form, integrates various I/O controllers, provides interfaces to peripheral devices and buses, and transfers data to/from the North Bridge 120 through the dedicated interconnection 128. For example, the South Bridge 130 provides integrated device electronics (IDE) 142 and universal serial bus (USB) 146 interfaces. Common IDE devices include magnetic and optical disk drives. An onboard Super I/O chip 140 is connected to the South Bridge 130 through a Low Pin Count (LPC) bus 134, which may provide floppy disk interface, keyboard interface, pointer device ports, parallel and serial ports, as well as infrared ports. An Ethernet controller 144 typically links to the South Bridge 130 through a PCI bus 132. In addition, a flash memory 148 may be directly, or through the LPC bus 134, connected to the South Bridge 130, which is used to store the low-level basic input-output system (BIOS) application. As described above, CPU 110, DRAM subsystem 112, North Bridge 120, South Bridge 130, as well as various devices and buses connected to the chipset are referred to as system resources hereinafter. The present invention, however, is not limited to any particular type of computer system.

Figure 2:
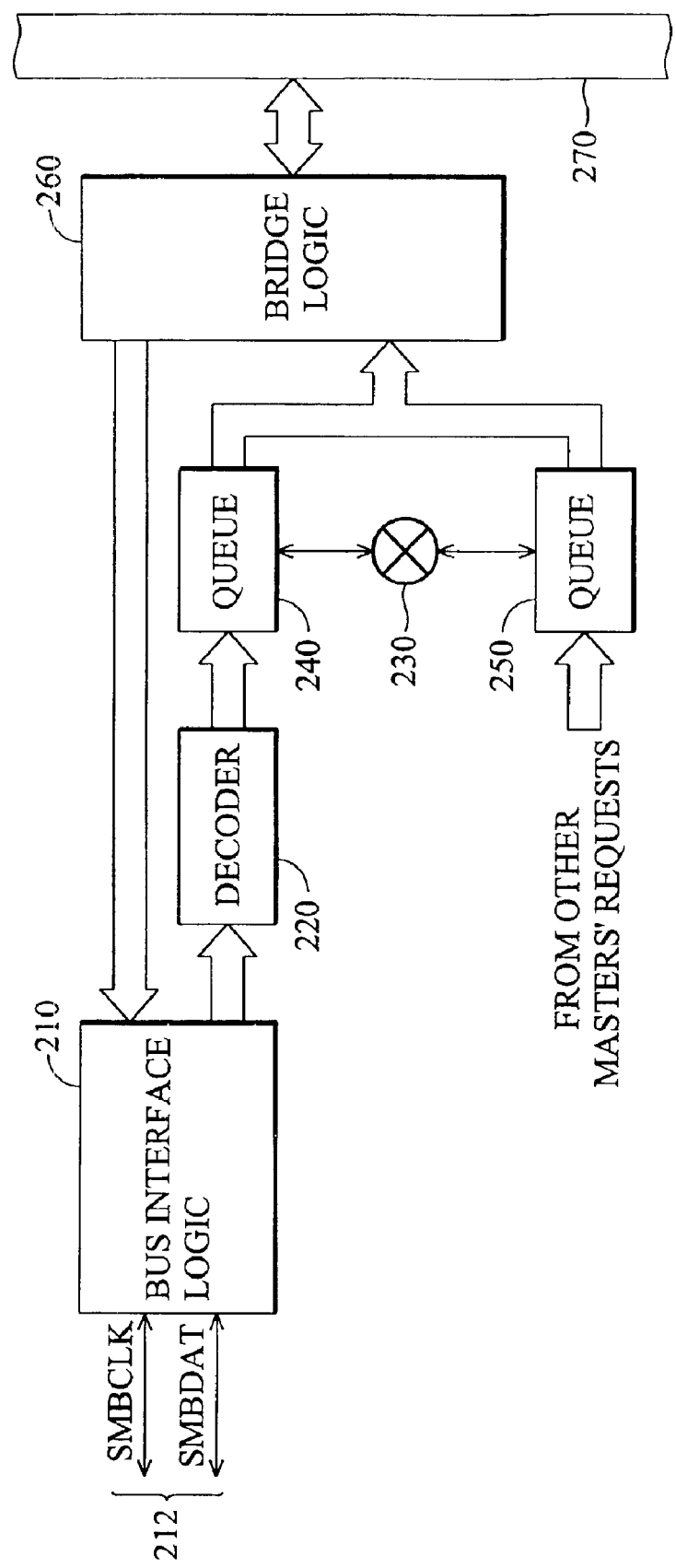
FIG. 2 is a functional block diagram of a preferred embodiment in accordance with the present invention.

Referring to FIG. 2, an apparatus 200 with two-wire serial interface which can act as a master to monitor the computer system resources is illustrated in accordance with the invention. The apparatus 200 of the invention may be integrated into the South Bridge or the North Bridge depending on practical applications. As depicted, the apparatus 200 of the invention includes bus interface logic 210, bridge logic 260, a decoder 220, an arbitrator 230 and a queue 240. The bus interface logic 210 is used to interface with a two-wire serial bus and parse a bitstream through the two-wire serial bus into a command and an address. It further parses the bitstream into data, if necessary. Preferably, the two-wire serial bus is compliant with the SMBus specification. The bus interface logic 210 provides two bi-directional lines SMBCLK and SMBDAT for connection to SMBus 212. The decoder 220 receives information from the bus interface logic. With the decoder 220, the received command is decoded and checked to see whether it belongs to a special cycle command as will be detailed below. If the command pertaining to a special cycle command represents a predetermined request for access to a resource bus, the decoder 220 further passes the predetermined request associated with the address to the queue 240. The queue 240 is used to hold a plurality of such predetermined requests waiting to be processed. Note that the resource bus may stand for the CPU bus, the memory bus, the dedicated interconnection between the North and the South Bridges, as well as the PCI bus and the like, whereon the computer system resources reside. In addition, there is another queue 250 for holding ordinary requests initiated by other masters.

Still referring to FIG. 2, the arbitrator 230 evaluates and arranges the pending requests for access to the resource bus in the queues 240 and 250. That is, it performs bus arbitration between the predetermined request in the queue 240 and the ordinary request in the queue 250. According to the invention, the predetermined request in the queue 240 is assigned to the highest priority for access to the resource bus such that the arbitrator 230 always grants control of the resource bus to the predetermined request first. Whenever the predetermined request occurs, the arbitrator 230 grants the resource bus to the predetermined request and allows the queue 240 to output the predetermined request associated with the address. The bridge logic 260 is provided to interface with a resource bus 270. It can transfer data to and from the computer system resources according to a request of a winner of the arbitration.

Figure 3A:
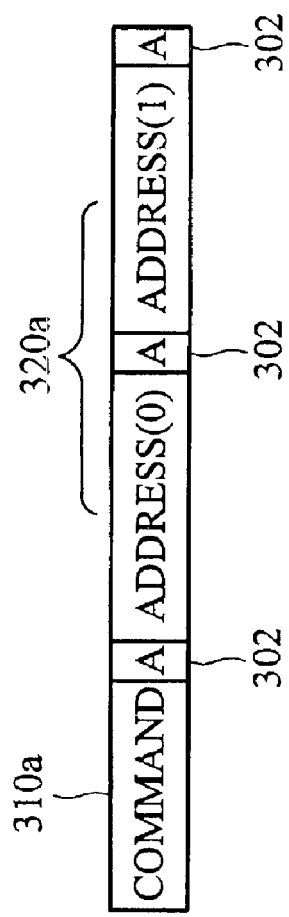
FIGS. 3A–3D are diagrams illustrating special SMbus protocols in accordance with the present invention.
Figure 3B:
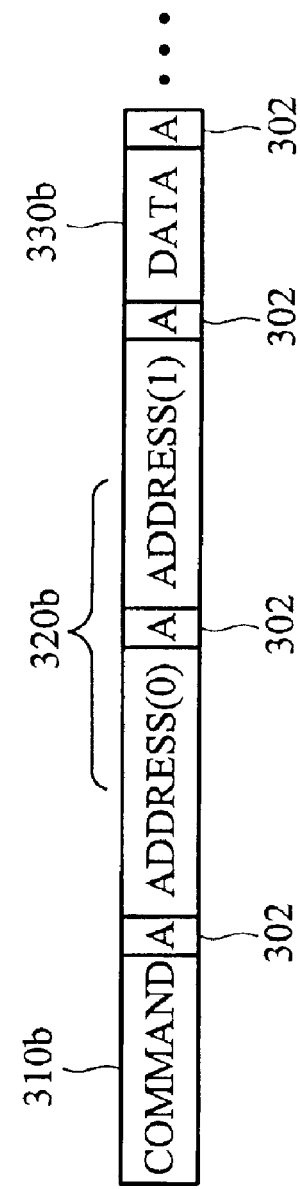

Turning now to FIGS. 3A~3D, four special SMbus protocols of the invention are illustrated. These special SMBus protocols still conform to the SMBus specification. Every byte put on the SMbus must be 8 bits long. Each byte has to be followed by an acknowledge bit. FIGS. 3A and 3B show protocols related to special I/O read and write cycles, respectively. The first byte 310a of a special I/O read access in FIG. 3A is a COMMAND, and it must be followed by an A (acknowledge) bit 302. The next two bytes 320a are ADDRESS(0) and ADDRESS(1) for a 16-bit I/O address followed by the respective A bits 302. In terms of hexadecimal notation, the COMMAND 310a has a value of 0xF6 to request an I/O read transfer on the resource bus according to the invention. As to a special I/O write access in FIG. 3B, the first byte 310b is a COMMAND followed by the A bit 302. The next two bytes 320b are ADDRESS(0) and ADDRESS (1) for a 16-bit I/O address followed by the respective A bits 302, respectively. The next one or more bytes 330b are the DATA to be written. Each DATA byte 330b is followed by the A bits 302. According to the invention, the COMMAND 310b has a value of 0xF7, in terms of hexadecimal notation, to request an I/O write transfer on the resource bus.

Figure 3C:
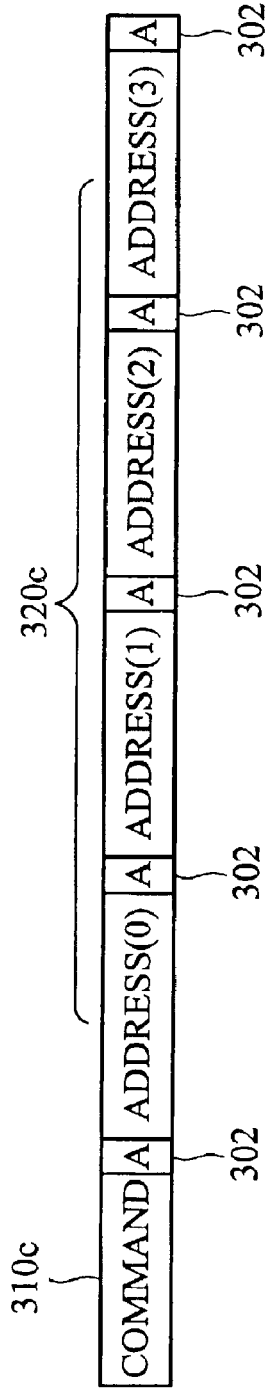
Figure 3D:
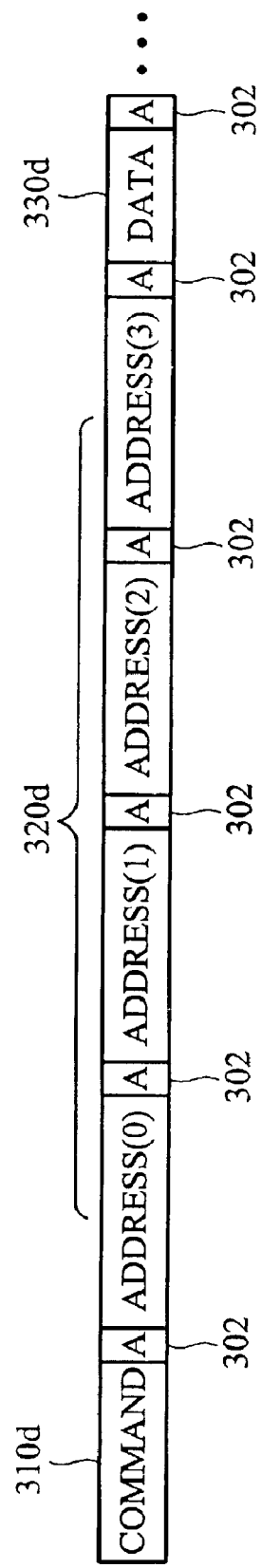

FIGS. 3C and 3D show protocols related to special memory read and write cycles, respectively. Referring to FIG. 3C, the first byte 310c of a special memory read access is a COMMAND, and it is followed by the A bit 302. The next four bytes 320c are ADDRESS(0)~ADDRESS(3) for a 32-bit memory address followed by the respective A bits 302. In terms of hexadecimal notation, the COMMAND 310c has a value of 0xF4 to request a memory read transfer on the resource bus according to the invention. As to a special memory write access in FIG. 3D, the first byte 310d is a COMMAND followed by the A bit 302. The next four bytes 320d are ADDRESS(0)~ADDRESS(3) for a 32-bit memory address followed by the respective A bits 302, respectively. The next one or more bytes 330d are the DATA to be written. Each DATA byte 330d is followed by the A bits 302. According to the invention, the COMMAND 310d has a value of 0xF5, in terms of hexadecimal notation, to request a memory write transfer on the resource bus.

It is very useful for system designers and developers to exploit the inventive apparatus to monitor and probe computer system resources. For example, a system designer may use an add-in card connected to a computer system incorporating the inventive apparatus via the SMbus to query and modify the state of the computer system resources if there is a bus hang, a processor is halted, or the processor is suspended in certain cycles. Of course, the add-in card is compatible with the SMBus and capable of issuing the special cycle commands as defined in the present invention to communicate with the computer system resources through the inventive apparatus. When the apparatus 200 of the invention is addressed by the add-in card, referring again to FIG. 2, it then parses a bitstream through the SMBus into a command and an address with the bus interface logic 210. If the command has a value of 0xF6, the decoder 220 interprets it as a predetermined request for an I/O read transfer on the resource bus 270. As a result, the apparatus 200 becomes a master and this request is pended in the queue 240. Since the predetermined request is assigned to the highest priority, the arbitrator 230 grants control of the resource bus 270 to the predetermined request for the I/O read transfer first. According to the predetermined request and the address, the bridge logic 260 performs the I/O read transfer and returns the state of an interested computer resource to the bus interface logic 210. Thus, the apparatus 200 of the invention reports the state of the interested computer resource to the add-in card via the SMBus.

Accordingly, the apparatus 200 with SMBus serial interface has the capability to act as a master initiating a transaction to access the computer system resources. The apparatus 200 of the invention incorporates an on-chip interface 210 which allows the apparatus 200 to communicate directly with other SMBus compatible devices via the SMBus. The simple two-wire serial SMBus minimizes interconnections so integrated circuits incorporating the apparatus 200 have fewer pins and there are not so many printed circuit board (PCB) tracks. This results in smaller and less expensive PCBs. In addition, the integrated SMBus protocol eliminates the need for address decoders and other "glue logic". It also increases system design flexibility by allowing simple construction of system variants and easy upgrading to keep designs up-to-date.

Additionally, the present invention provides a method for a two-wire serial bus compliant with the SMBus specification to read/write data from/to the computer system resources. The method of the present invention comprises the steps as follows. First, a bitstream from the two-wire serial bus is obtained. Then, the bitstream is parsed into a command and an address. The command is subsequently decoded by the decoder 220. If the command represents a predetermined request for access to the resource bus 270 whereon the computer system resources reside, the decoder 220 passes the predetermined request associated with the address to the queue 240. Whenever the predetermined request occurs, the resource bus 270 is granted to the predetermined request and the queue 240 is allowed to output the predetermined request associated with the address. Thus, according to the predetermined request and the address, data is transferred to or from the computer system resources through the bridge logic 260.

While the invention has been described by way of example and in terms of the preferred embodiment, it is to be understood that the invention is not limited to the disclosed embodiment. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An apparatus for monitoring computer system resources comprising:
    a queue;
    bus interface logic for interfacing with a serial bus and parsing a bitstream through the serial bus into a command and an address;
    a decoder for decoding the command, and passing a predetermined request associated with the address to the queue if the command represents the predetermined request for access to a resource bus whereon the computer system resources reside;
    an arbitrator, whenever the predetermined request occurs, for granting the resource bus to the predetermined request and allowing the queue to output the predetermined request associated with the address; and
    bridge logic for interfacing with the resource bus and transferring data to and from the computer system resources in accordance with the predetermined request and the address;
    wherein the serial bus is a two-wire interface compliant with the System Management Bus (SMBus) specification, wherein the predetermined request is used to request an I/O read transfer on the resource bus, and wherein the decoder interprets the command parsed from the SMBus as the predetermined request for the I/O read transfer on the resource bus if the command's value is 0xF6 in terms of hexadecimal notation.

2. An apparatus for monitoring computer system resources comprising:
    a queue;
    bus interface logic for interfacing with a serial bus and parsing a bitstream through the serial bus into a command and an address;
    a decoder for decoding the command, and passing a predetermined request associated with the address to the queue if the command represents the predetermined request for access to a resource bus whereon the computer system resources reside;
    an arbitrator for granting the resource bus to the predetermined request and allowing the queue to output the predetermined request associated with the address, whenever the predetermined request occurs; and
    bridge logic for interfacing with the resource bus and transferring data to and from the computer system resources in accordance with the predetermined request and the address;
    wherein the serial bus is a two-wire interface compliant with the System Management Bus (SMBus) specification, wherein the predetermined request is used to request an I/O write transfer on the resource bus, and wherein the decoder interprets the command parsed from the SMBus as the predetermined request for the I/O write transfer on the resource bus if the command's value is 0xF7 in terms hexadecimal notation.

3. An apparatus for monitoring computer system resources comprising:
    a queue;
    bus interface logic for interfacing with a serial bus and parsing a bitstream through the serial bus into a command and an address;
    a decoder for decoding the command, and passing a predetermined request associated with the address to the queue if the command represents the predetermined request for access to a resource bus whereon the computer system resources reside;
    an arbitrator for granting the resource bus to the predetermined request and allowing the queue to output the predetermined request associated with the address, whenever the predetermined request occurs; and
    bridge logic for interfacing with the resource bus and transferring data to and from the computer system resources in accordance with the predetermined request and the address;
    wherein the serial bus is a two-wire interface compliant with the System Management Bus (SMBus) specification, the predetermined request is used to request a memory read transfer on the resource bus, and wherein the decoder interprets the command parsed from the SMBus as the predetermined request for the memory read transfer on the resource bus if the command's value is 0xF4 in terms of hexadecimal notation.

4. An apparatus for monitoring computer system resources comprising:
    a queue;
    bus interface logic for interfacing with a serial bus and parsing a bitstream through the serial bus into a command and an address;
    a decoder for decoding the command, and passing a predetermined request associated with the address to the queue if the command represents the predetermined request for access to a resource bus whereon the computer system resources reside;
    an arbitrator for granting the resource bus to the predetermined request and allowing the queue to output the predetermined request associated with the address, whenever the predetermined request occurs; and
    bridge logic for interfacing with the resource bus and transferring data to and from the computer system resources in accordance with the predetermined request and the address;
    wherein the serial bus is a two-wire interface compliant with the System Management Bus (SMBus) specification, the predetermined request is used to request a memory write transfer on the resource bus, and wherein the decoder interprets the command parsed from the SMBus as the predetermined request for the memory write transfer on the resource bus if the command's value is 0xF5 in terms of hexadecimal notation.

* * * * *